US011860334B2

United States Patent
Bergstrom et al.

(10) Patent No.: US 11,860,334 B2
(45) Date of Patent: Jan. 2, 2024

(54) CLUSTERED AI FOR OPTIMIZED PREDICTIONS

(71) Applicant: QUISnet, Inc., Draper, UT (US)

(72) Inventors: Mattias Bergstrom, Puerto de la Cruz (ES); Christopher Bijou, Draper, UT (US); Stan Miasnikov, Spokane, WA (US); Torkel Lindstrom, Puerto de la Cruz (ES)

(73) Assignee: QUISnet, Inc., Draper, UT (US)

( * ) Notice: Subject to any disclaimer, the term of this patent is extended or adjusted under 35 U.S.C. 154(b) by 262 days.

(21) Appl. No.: 16/999,037

(22) Filed: Aug. 20, 2020

(65) Prior Publication Data

US 2021/0055453 A1 Feb. 25, 2021

Related U.S. Application Data

(60) Provisional application No. 62/889,316, filed on Aug. 20, 2019.

(51) Int. Cl.
  *G01W 1/10* (2006.01)
  *G06F 18/23* (2023.01)
  *G06F 18/214* (2023.01)

(52) U.S. Cl.
  CPC ............ *G01W 1/10* (2013.01); *G06F 18/214* (2023.01); *G06F 18/23* (2023.01)

(58) Field of Classification Search
  CPC ..... G01W 1/10; G06K 9/6218; G06K 9/6256; G06K 9/6274; G06F 18/23; G06F 18/214
  See application file for complete search history.

(56) References Cited

U.S. PATENT DOCUMENTS

| 10,387,802 | B2* | 8/2019 | Heng | G06N 5/04 |
| 10,996,374 | B1* | 5/2021 | Nazir | G01W 1/10 |
| 11,315,046 | B1* | 4/2022 | Cook | G01W 1/10 |
| 2019/0213039 | A1* | 7/2019 | Lecue | G06F 16/35 |

OTHER PUBLICATIONS

Grover et al. (A Deep Hybrid Model for Weather Forecasting. In Proceedings of the 21th ACM SIGKDD International Conference on Knowledge Discovery and Data Mining (KDD '15). Association for Computing Machinery, New York, NY, USA, 379-386. 2015, https://doi.org/10.1145/2783258.2783275) (Year: 2015).*
Labelbox (How to Measure Quality When Training Machine Learning Models A Deep Dive into Benchmarks, Consensus, and Review, medium.com/hackernoon, Jan. 30, 2019) (Year: 2019).*
Plewczynski (Brainstorming: Consensus Learning in Practice, ICM, Interdisciplinary Centre for Mathematical and Computational Modelling, University of Warsaw, 2009) (Year: 2009).*

\* cited by examiner

*Primary Examiner* — Daniel R Miller
*Assistant Examiner* — Christian T Bryant

(57) ABSTRACT

A system for generating short-, medium, long-range and specific area and effect weather or climate forecasts by training a cluster of AI to "understand" the physics that effects the weather and running the clusters on a decentralized computing system or network. Individual modules for specific knowledge of different climate-variability phenomena can be integrated and interrogated to calculate the forecast based on a consensus of future predictions based on a subset of the clusters. The selection criteria determining which modules are deemed to fit may be adjusted to optimize the use of observations in forecasting specific climate variables or geographic regions in order to develop forecasts tailored to particular applications.

16 Claims, 3 Drawing Sheets

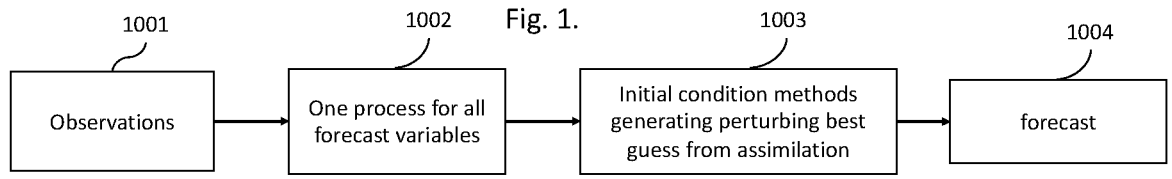
Fig. 1.
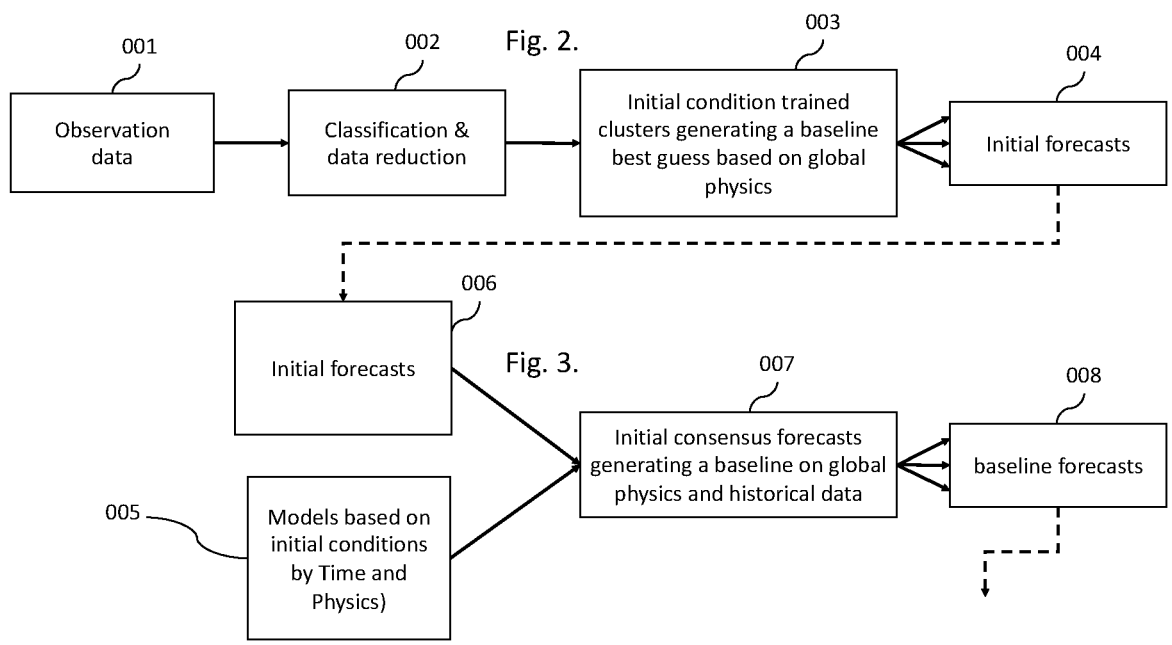
Fig. 2.
Fig. 3.

Example effects = Fog, Mist

CLUSTERED AI FOR OPTIMIZED PREDICTIONS

FIELD

The present invention relates generally to forecasting, particularly to weather forecasting using a clustered AI. More specifically, dynamic weather data classification, packaging and AI-based computations and methods are disclosed for optimizing weather prediction for but not limited to short-, medium, long-range and specific area effects.

SUMMARY

The present invention relates generally to forecasting, particularly to weather forecasting using a clustered AI. More specifically, dynamic weather data classification and reduction by registering changes in observation data, packaging and AI-based computations and methods are disclosed for optimizing weather prediction for but not limited to short-, medium, long-range and specific areas.

Various embodiments of this invention are disclosed in the context of weather prediction applications; but the underlying concepts are applicable to a host of other prediction systems and applications, particularly those which benefit from specific area and time or long-term prediction.

In one embodiment, raw weather data is distributed to and ingresses by dynamically selected decentralized nodes to classify the raw weather data. in a further embodiment, the classified data is distributed to all decentralized nodes, and then utilized to calculate global baseline predictions using clustered neural net.

In a further embodiment, raw weather data is distributed to and ingresses by dynamically selected decentralized nodes to classify the raw weather data. In a further embodiment, the classified data is distributed to all decentralized nodes, and then utilized to calculate global baseline predictions using clustered neural net.

In a further embodiment, raw weather data is distributed to and ingresses by dynamically selected decentralized nodes to classify the raw weather data. In a further embodiment, the classified data is distributed to all decentralized nodes, and then utilized to calculate area, time and effect specific predictions using clustered neural net.

BRIEF DESCRIPTION OF THE DRAWINGS

Some embodiments of the invention may be further described by way of example with reference to the accompanying drawings in which:

FIG. 1 illustrates schematically the prior state-of-the-art method of forecasting;

FIGS. 2 & 3 illustrates schematically a clustered AI method of baseline forecasting in accordance with an embodiment of the present invention;

DETAILED DESCRIPTION

Figure 4:
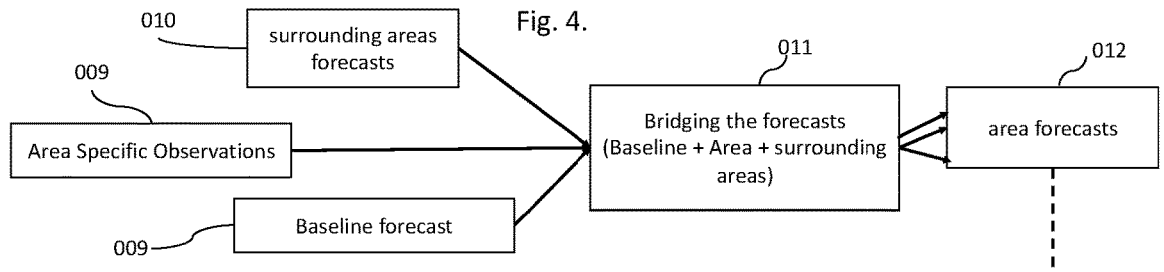
FIGS. 4 & 5 illustrates schematically a clustered AI method of area-based weather effect forecasting in accordance with an embodiment of the present invention for use with the embodiment of FIGS. 2 & 3.

People have attempted to predict the weather informally for millennia and formally since the 19th century. Weather forecasts are made by collecting quantitative data about the current state of the atmosphere at a given place and using meteorology to project how the atmosphere will change.

Once calculated by hand based mainly upon changes in barometric pressure, current weather conditions, and sky condition or cloud cover, weather forecasting now relies on computer-based models that take many atmospheric factors into account. Human input is still used to pick the best possible forecast model to base the forecast upon, which involves pattern recognition skills, teleconnections, knowledge of model performance, and knowledge of model biases.

The inaccuracy of forecasting is due to the chaotic nature of the atmosphere, the massive computational power required to solve the equations that describe the atmosphere, the error involved in measuring the initial conditions, and an incomplete understanding of atmospheric processes.

Hence, forecasts become less accurate as the difference between current time and the time for which the forecast is being made (the range of the forecast) increases. The use of clusters, model and result consensus help narrow the error and pick the most likely outcome.

By using area relationship data bridging, to understand more about the weather we break the earth into areal pieces, where each area both consumers and provisions weather components, such as consuming rain, or provisioning water vapor, by clustering the Consumed and Provisioned components before applying fluid dynamic algorithms.

By removing Solar energy and look at some of the constants that are, but not limited to, Earth Rotation, Gravity, Lunar Pull, Temperature, Pressure, Earthquakes, would still exist, they would not change so it gives a starting baseline.

Add the Sun and we start getting additional weather components such as but not limited to, Solar intensity, Solar storms, variable Temperatures, Night and Day, Some of the weather effects of adding solar components to the Earth constants are things like Evaporation of water that leads to Clouds, Fog and Haze. Raised temperatures lead to liquid oceans that leads to Tidal effects through Lunar pull.

Water and Ground heating leads to warm, "accelerated" air that together with Earth's rotation leads to winds and clouds, the more accelerate the air gets the faster it will raise up and reach higher altitudes before cooling off, as air is warmer and denser closer to Earth.

There are a variety of end uses to weather forecasts. Weather warnings are important forecasts because they are used to, through alert systems, protect life and property.

FIGS. 2 & 3 illustrates an embodiment of the invention. As indicated 003 predictions are set to run from a large number of differently trained AI's and different initial conditions on a large number of Nodes. The different training sets are set to negate different unknown factors in the prediction area. The different initial conditions are obtained by picking different historical real-world measurements from observation data.

The results of the generational runs are then chosen by consensus 007 with real-world observations over the present and recent past. The observations may be of, but not limited to, the current and past state of the atmosphere-ocean system, such as solar intensity, atmospheric winds, temperatures, pressure, cloud properties, precipitation, surface fluxes, sea level, sea surface temperatures, ocean thermal structure, salinity, soil moisture, vegetation, sea ice and derivatives thereof and a subset of the forecasts are selected which are consistent, or show the best consistency, with the observations 008.

Figure 5:
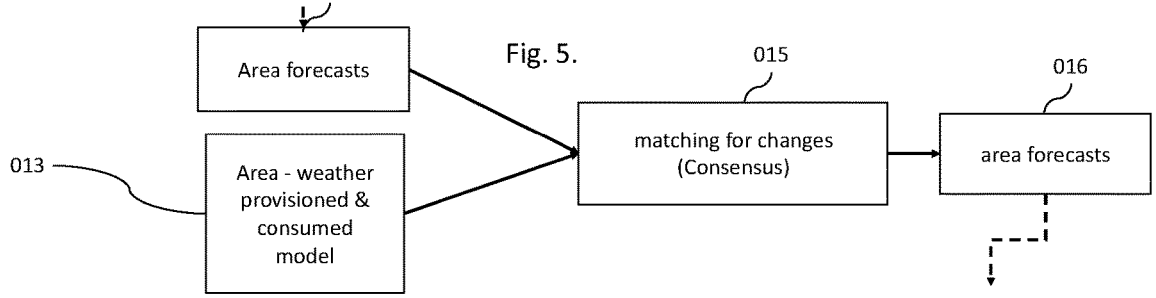

FIGS. 4 & 5 An area specific forecast may be made by combining the results of subsets of forecasts, and the combination may be weighted in accordance with the closeness of the fit of the forecast to the observations. It is also possible to provide an estimate of the likely accuracy of the forecast by examining whether the forecast trajectories in the subset remain in close proximity to each other over the forecast period. If they do then the climatic situation is regarded as potentially predictable. However, if the trajectories diverge rapidly, it is clear that the situation is not very predictable, and the forecast may be less accurate.

Figure 6:
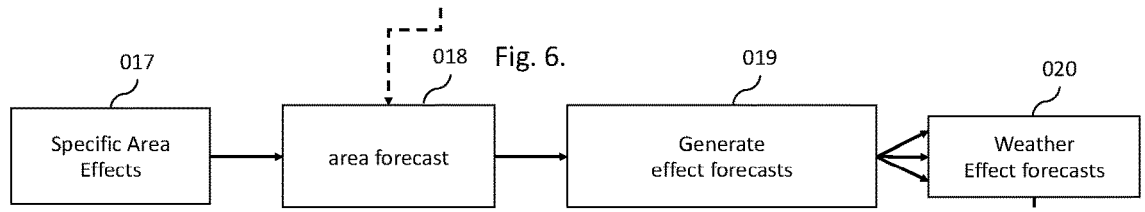
FIGS. 6 & 7 illustrates schematically a clustered AI method of area-based weather effect forecasting in accordance with an embodiment of the present invention for use with the embodiment of FIGS. 4 & 5.
Figure 7:
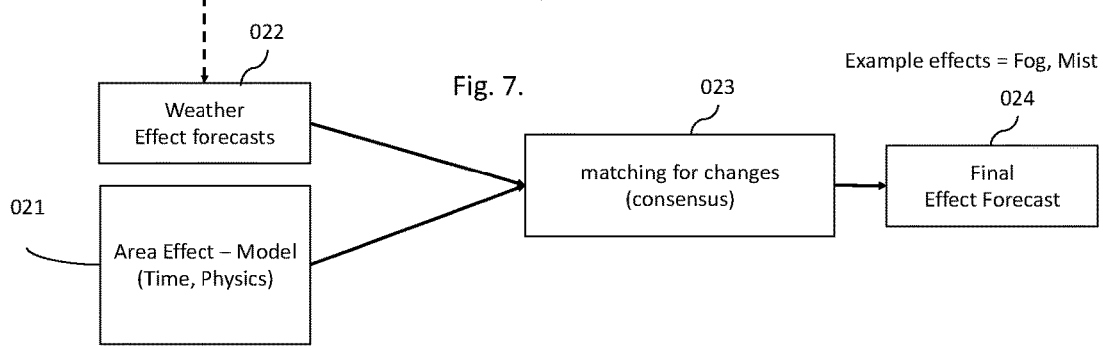

FIGS. 6 & 7 A specific area weather effect prediction, such as fog at an airport, maybe made by expanding the area forecast using a similar model to FIGS. 4 & 5 but by having a more granular approach achieve a forecast of weather effects and their occurrence time(s).

Figure 8:
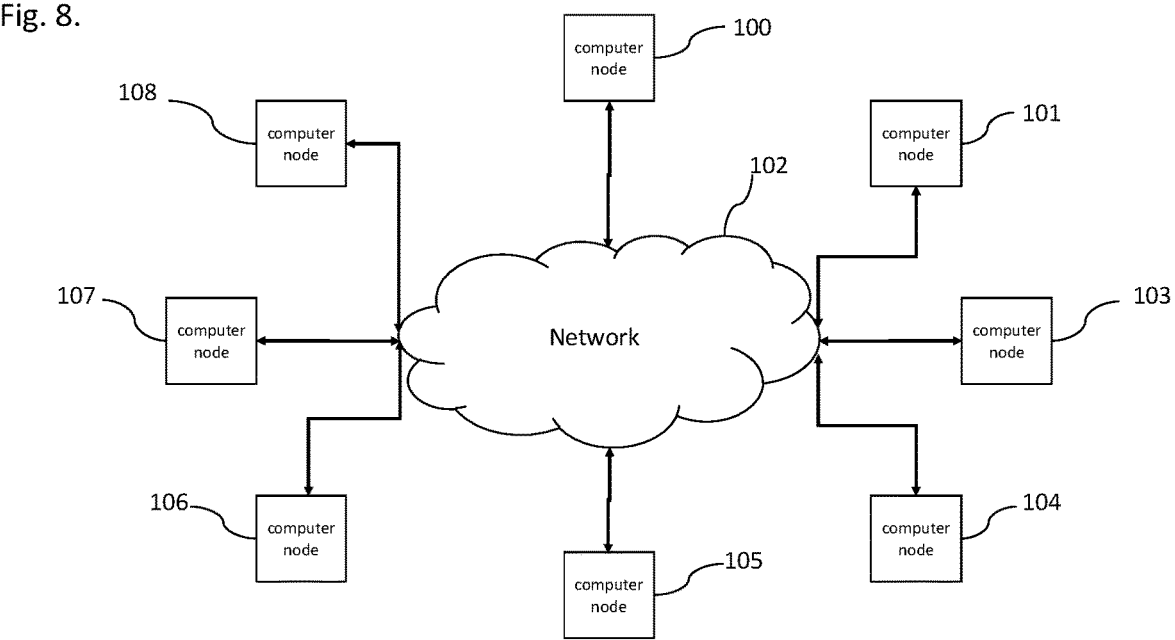
FIG. 8 illustrates an embodiment of Clustered AI Node.

FIG. 8 A Clustered AI Node 100 is connected to a network 102 such as the Internet. One or more Clustered Neural Net Nodes 104-106 are also connected to the network 102. The Clustered Neural Net Nodes 104-106 can be personal computers, servers, thin clients, mainframes, or quantum computers.

Figure 9:
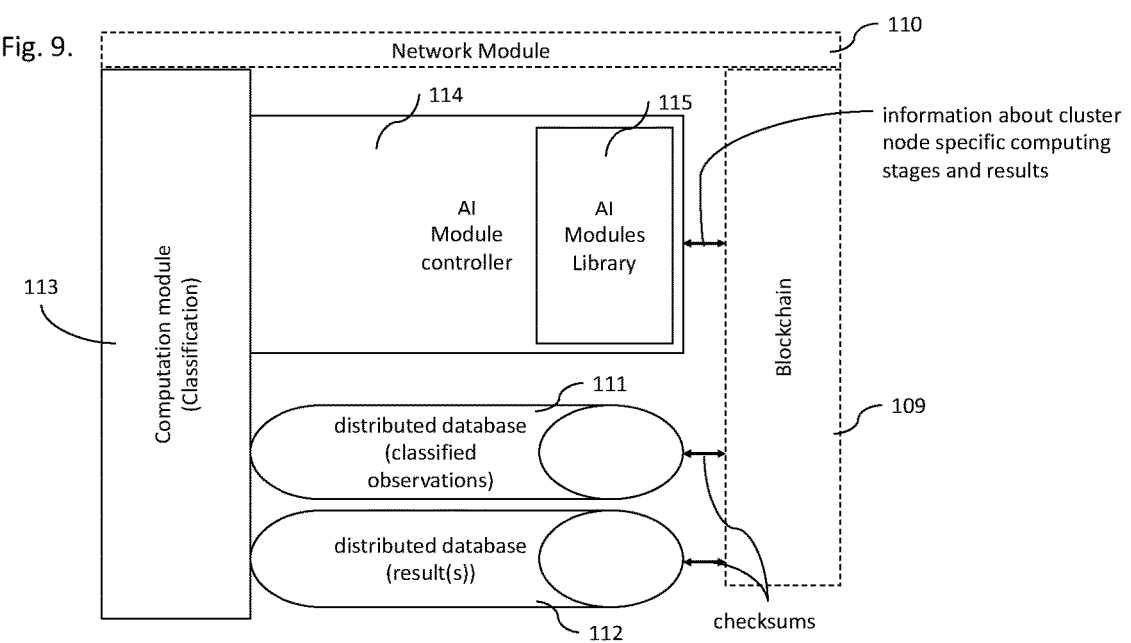
FIG. 9 Illustrates an embodiment of a service node implementation.

FIG. 9 The clustered service node uses a blockchain 109 to verify the data consistency in the cluster FIG. 8, and uses a distributed database 111 & 112 to balance both the classified data and the result data. Sets of training data modules 115 can be "hot-swapped" without turning of the system, so that the AI can be upgraded at a continues scale.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A method comprising:
    running multiple clusters of AI's to predict weather states, with the clusters of AI's having different initial training using weather forecasts, wherein each AI within each cluster of AI's is differently trained based on different training sets that are set to negate different unknown factors in a prediction area;
    achieving consensus by comparing the weather states predicted by each of the clusters of AI's with a corresponding set of real-world observations;
    selecting those clusters of AI's having predicted weather states which fit to a predetermined extent with the set of real-world observations;

selecting a subset of weather forecasts from the weather states that are consistent with the set of real-world observations;

producing a weather forecast from the subset of weather forecasts subsequently predicted by the selected clusters of AI's;

classifying the weather states by adding and removing subsets of weather components and registering constants in observation data; and calculating global baseline predictions based on the classified weather states, using the selected clusters of AI's.

2. The method of claim 1, wherein classifying the weather states further comprises distributing the weather states to dynamically selected decentralized nodes.

3. The method of claim 1, further comprising calculating area, time, and effect specific predictions based on the classified data, using the selected clusters.

4. The method of claim 1, further comprising running the clusters of AI's under different initial conditions, wherein the different initial conditions are obtained by picking different historical real-world measurements from a set of real-world observation data.

5. The method of claim 1, wherein the set of real-world observations comprise at least the current and past state of the atmosphere-ocean systems which include: solar intensity, atmospheric winds, temperatures, pressure, cloud properties, precipitation, surface fluxes, sea level, sea surface temperatures, ocean thermal structure, salinity, soil moisture, vegetation, and sea ice.

6. The method of claim 1, further comprising producing an area specific forecast by combining the results of the subsets of forecasts, wherein the combined result is weighted in accordance with the closeness of the fit of the area specific forecast to the set of real-world observations.

7. The method of claim 1, further comprising providing an estimate of the accuracy of the weather forecast by examining whether forecast trajectories in the subset of weather forecasts remain in close proximity to each other over a forecast period.

8. A non-transitory, tangible computer readable medium communicatively coupled to the one or more processors and storing executable instructions executable by the one or more processors to perform:

running multiple clusters of AI's to predict weather states, with the clusters of AI's having different initial training using weather forecasts, wherein each AI within each cluster of AI's is differently trained based on different training sets that are set to negate different unknown factors in a prediction area;

achieving consensus by comparing the weather states predicted by each of the clusters of AI's with a corresponding set of real-world observations;

selecting those clusters of AI's having predicted weather states which fit to a predetermined extent from the set of real-world observations;

selecting a subset of weather forecasts from the weather states that are consistent with the set of real-world observations;

producing a weather forecast from the subset of weather forecasts subsequently predicted by the selected clusters of AI's;

classifying the weather data states by adding and removing subsets of weather components and registering constants in observation data; and calculating global baseline predictions based on the classified weather states, using the selected clusters of AI's.

9. The non-transitory, tangible computer readable medium of claim 8, wherein classifying the weather states further comprises distributing the weather states to dynamically selected decentralized nodes.

10. The non-transitory, tangible computer readable medium of claim 8, further comprising calculating area, time, and effect specific predictions based on the classified data, using the selected clusters.

11. The non-transitory, tangible computer readable medium of claim 8, further comprising running the clusters of AI's under different initial conditions, wherein the different initial conditions are obtained by picking different historical real-world measurements from a set of real-world observation data.

12. The non-transitory, tangible computer readable medium of claim 8, wherein the set of real-world observations comprise at least the current and past state of the atmosphere-ocean system which include: solar intensity, atmospheric winds, temperatures, pressure, cloud properties, precipitation, surface fluxes, sea level, sea surface temperatures, ocean thermal structure, salinity, soil moisture, vegetation, and sea ice.

13. The non-transitory, tangible computer readable medium of claim 8, further comprising producing an area specific forecast by combining the results of the subsets of forecasts, wherein the combined result is weighted in accordance with the closeness of the fit of the area specific forecast to the set of real-world observations.

14. The non-transitory, tangible computer readable medium of claim 8, further comprising providing an estimate of the accuracy of the weather forecast by examining whether forecast trajectories in the subset of weather forecasts remain in close proximity to each other over a forecast period.

15. The non-transitory, tangible computer readable medium of claim 14, wherein if the forecast trajectories in the subset of weather forecasts remain in close proximity to each other over the forecast period, then the weather forecast is regarded as predictable with high accuracy and if the trajectories diverge rapidly, the forecast is regarded as less accurate.

16. The non-transitory, tangible computer readable medium of claim 8, wherein the clusters of AI's at least comprise personal computers, servers, thin clients, mainframes, or quantum computers.

* * * * *